Aug. 26, 1941.   E. M. SPLAINE   2,253,960
OPHTHALMIC MOUNTING
Filed Nov. 1, 1938
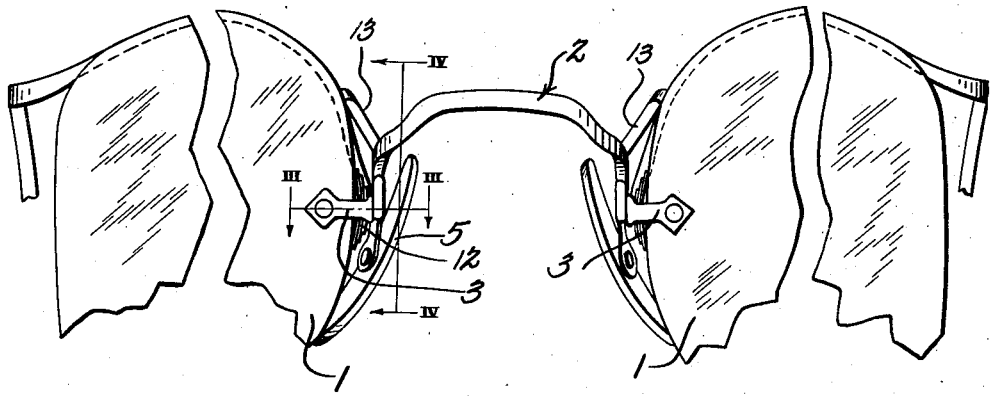
Fig. I
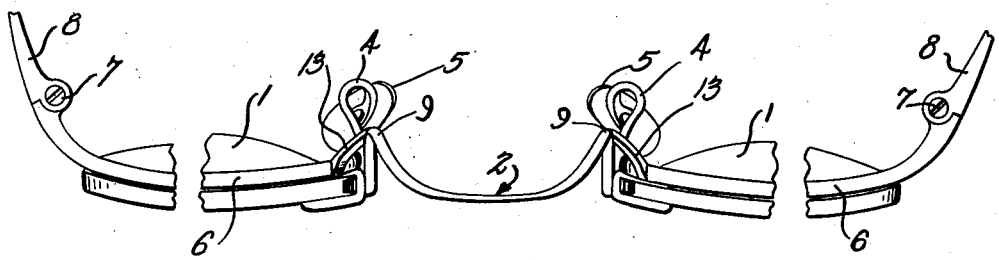
Fig. II
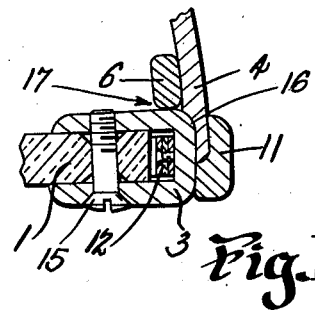
Fig. III
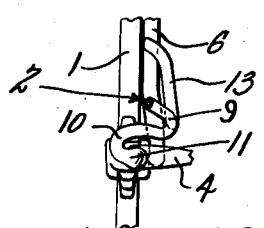
Fig. IV
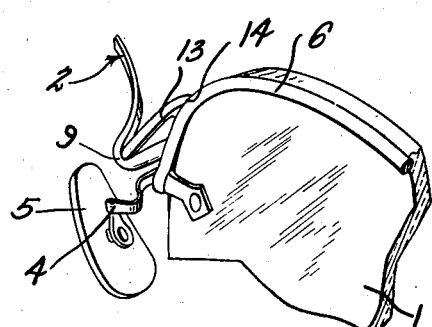
Fig. V
INVENTOR
EDWARD M. SPLAINE
BY
Harry H. Styll
ATTORNEY Patented Aug. 26, 1941

2,253,960

UNITED STATES PATENT OFFICE 2,253,960

OPHTHALMIC MOUNTING

Edward M. Splaine, Southbridge, Mass., assignor to American Optical Company, Southbridge, Mass., a voluntary association of Massachusetts Application November 1, 1938, Serial No. 238,171

2 Claims. (Cl. 88—47)

This invention relates to improvements in ophthalmic mountings and has particular reference to improved means of making and assembling the same.

One of the principal objects of the invention is to provide an ophthalmic mounting having bridge means for supporting the lenses of the mounting in aligned relation with each other and relatively long and slender temple supports shaped substantially to the upper contour shape of the lenses, whereby the connection between the temple supports and the bridge will be greatly reinforced to increase the rigidity of the mounting with the said reinforcing means adjustable so that parts may be positioned in desired relation with each other.

Another object of the invention is to provide an ophthalmic mounting wherein the parts may be quickly and easily adjusted to lenses and to the facial requirements of different individuals, and which will be durable and efficient in properly supporting the lenses before the eyes and in maintaining said adjustments during use.

Another object of the invention is to provide an ophthalmic mounting of the above character whereby shock and strain on the lens supporting portion of the mounting will be directed away from lenses of said mounting.

Another object of the invention is to provide new and improved means of making and assembling mountings having the above characteristics.

Other objects and advantages of the invention will become apparent from the following description in connection with the accompanying drawing, and it will be apparent that many changes may be made in the details of construction and arrangement of parts without departing from the spirit of the invention as expressed in the accompanying claims. I, therefore, do not wish to be limited to the exact details of construction and arrangement of parts shown and described as the preferred form has been given by way of illustration only.

Referring to the drawing:

Fig. I is a fragmentary face view of an ophthalmic mounting embodying the invention;

Fig. II is a top or plan view of Fig. I;

Fig. III is a sectional view taken as on line III—III of Fig. I and looking in the direction of the arrows;

Fig. IV is a sectional view taken as on line IV—IV of Fig. I looking in the direction of the arrows; and Fig. V is a rear perspective view showing a portion of the bridge member.

There has recently been placed on the market a type of mounting known as semi-rimless. This type of mounting has a bridge member, lens holding means for hodling the lenses in alignment with each other and in connected relation with said bridge member and relatively long bar-like temple supporting members shaped to follow the upper contour edges of the lenses. This type of mounting is desirable because it has the appearance of a rimless or frameless type spectacle, together with the advantages of the frame type spectacle.

It is particularly desirable in semi-rimless type mountings to have the said bar-like temple supports maintain a desired relation with the lenses and be such as to relieve shock or strain on the lenses during the use of the mounting.

It, therefore, is one of the principal objects of this invention to provide supporting means for a semi-rimless type mounting whereby shock or strain imparted to the supporting portion of the mounting is directed away from the lenses and the said relatively long temple supports will more positively maintain their desired relation with the lenses during the use of the mounting.

Referring more particularly to the drawing wherein like characters of reference designate like parts throughout the several views, the device embodying the invention comprises broadly a pair of lenses 1 connected to a bridge member 2 by suitable lens holding means such as the lens straps 3. The lens straps 3 are connected to the lenses 1 by suitable connecting means, such as screws 15, pins or solder united pin and tube members, or by any suitable means known in the art and are provided with resilient means 12 for engaging the edges of the lenses and for limiting the pivotal movement of the lens straps or lens holding means relative to said lenses and for relieving shock and strain on the lenses at said locations. Suitable nose pads 5 are supported by adjustable arms 4 extending rearwardly from points of connection 16 of said arms to said lens straps.

Extending from a point of connection 17 with the nose pad supporting arms 4 and the rear of the lens holding member 3, as shown in Fig. III, are long and slender temple supports 6 shaped substantially to the upper contour shape of the lenses. The said temple supports extend outwardly to a temple connection 7 to which temples 8 are pivotally attached.

It is apparent that while the temple supports 6 are shown secured to the nose pad supporting arms 4 and lens holding members 3, that the said supporting members 6 could be secured to other parts of the mounting as desired, and also, that while the temple supports are shown as being positioned in the rear of the plane of the lenses they could follow the contour edge of the lenses in the plane of said lenses or could be supported in the front of the plane of the lenses.

The bridge member 2 has a central arch portion shaped to fit over the nose and has rearwardly extending end portions 9 reversely bent to provide forwardly extending portions 10 and rearwardly extending portions 11. The rearwardly extending portions are secured partly to the edge of the lens holding member 3 and partly in overlapped relation with the end of the nose pad supporting arms 4, as shown in Fig. III.

Supporting members 13, secured adjacent one end thereof to the bridge member 2, and adjacent their opposite ends 14 to the temple supporting members 6 are provided to increase the rigidity of the mounting at said location.

The supporting members 13 are preferably made of such material and are of such a length as to allow adjustment by the use of pliers usual in the art, but are of sufficient rigidity as to otherwise hold the temple supports 6 so that they cannot be accidently moved out of adjusted position. It will be apparent that by adjustment of said supports 13 the temple supporting members 6 may be adjusted to desired relation with the lenses.

It will be apparent that while the parts of the mounting are shown as separate parts for the purposes of illustration, they can be made either separate or integral as desired.

It will also be noted that by adjustment of the supports 13 and the loops 9 of the bridge that the central arch portion of the bridge may be widened or narrowed as desired to fit the particular requirements of the wearer.

The central arch portion of the bridge may be formed relatively rigid, ductile or resilient, or the said bridge may have different portions thereof possessing one or more of the above characteristics.

The temple supports 6 may also be formed rigid, ductile or resilient, or may have different portions possessing one or more of said characteristics as desired.

The supporting members 13 are secured to the temple supports 6 at points spaced from the lens straps and extend downwardly and rearwardly, and are attached to the rearwardly extending loop portions 9 of the bridge. This provides strut-like supports which resist strain in a forward and rearward direction and also in sidewise directions.

From the above it will be seen that I have provided a new and improved ophthalmic mounting, together with new and improved means of making, assembling, and fitting the same, and particularly an ophthalmic mounting that may be easily and quickly adjusted to the particular requirements of the wearer, and which will retain the parts in adjusted position and prevent any accidental misplacement thereof during use.

Having described my invention, I claim:

1. In lens supporting means, associated bridge means, lens holding means and temple supporting means, said temple supporting means being connected to the lens supporting structure adjacent the lens holding means and adapted to extend along the upper contour edges of the lenses when in position thereon and terminating in temple connections, said lens holding means being adapted to be connected with the lenses and said bridge means comprising a central arch portion for spanning the nose and shaped to lie substantially in the direction of the plane of the lenses and terminating in rearwardly extending end portions which are looped forwardly and downwardly to depending end portions, said loop portions being disposed in a direction substantially normal to the plane of the lenses and said depending end portions being connected with the lens holding means and a relatively long and slender reinforcing connecting member secured adjacent one end thereof to the bridge member adjacent the rearwardly extending loop portion thereof and extending upwardly and secured adjacent the upper end thereof to the temple supporting member at a point spaced from the lens holding means, said reinforcing connection member being adapted to provide increased strength and rigidity at the sides of the bridge for preventing accidental displacement of said temple supporting members adjacent said bridge and being adapted to transmit shock and strain received by said temple supporting members to said central portion of the bridge to relieve said lenses from said shock and strain, when in position thereon.

2. An ophthalmic mounting embodying a pair of lenses and lens supporting means for said lenses, said lens supporting means comprising associated bridge means, lens holding means and temple supporting means, said temple supporting means being connected to the lens supporting structure adjacent the lens holding means and adapted to extend along the upper contour edges of the lenses and terminating in temple connections, said lens holding means being connected with the lenses and said bridge means comprising a central arch portion for spanning the nose and shaped to lie substantially in the direction of the plane of the lenses and terminating in rearwardly extending end portions which are looped forwardly and downwardly to depending end portions, said loop portions being disposed in a direction substantially normal to the plane of the lenses and said depending end portions being connected with the lens holding means and a relatively long and slender reinforcing connecting member secured adjacent one end thereof to the bridge member adjacent the rearwardly extending loop portion thereof and extending upwardly and secured adjacent the upper end thereof to the temple supporting member at a point spaced from the lens holding means, said reinforcing connection member being adapted to provide increased strength and rigidity at the sides of the bridge for preventing accidental displacement of said temple supporting members adjacent said bridge and being adapted to transmit shock and strain received by said temple supporting members to said central portion of the bridge to relieve said lenses from said shock and strain.

EDWARD M. SPLAINE.